US007660946B2

(12) United States Patent
Watanabe et al.

(10) Patent No.: US 7,660,946 B2
(45) Date of Patent: Feb. 9, 2010

(54) STORAGE CONTROL SYSTEM AND STORAGE CONTROL METHOD

(75) Inventors: Haruaki Watanabe, Isehara (JP); Kenji Yamagami, Odawara (JP)

(73) Assignee: Hitachi, Ltd., Tokyo (JP)

( * ) Notice: Subject to any disclaimer, the term of this patent is extended or adjusted under 35 U.S.C. 154(b) by 168 days.

(21) Appl. No.: 11/170,156

(22) Filed: Jun. 30, 2005

(65) Prior Publication Data
US 2006/0248297 A1 Nov. 2, 2006

(30) Foreign Application Priority Data
May 2, 2005 (JP) ............................. 2005-133978

(51) Int. Cl.
*G06F 12/02* (2006.01)
(52) U.S. Cl. ............... 711/113; 711/144; 711/E12.002; 711/E12.019; 711/E12.069
(58) Field of Classification Search .............. 711/111, 711/113, 144
See application file for complete search history.

(56) References Cited

U.S. PATENT DOCUMENTS 5,799,185 A * 8/1998 Watanabe ................. 707/206

| 6,658,434 B1 * | 12/2003 | Watanabe et al. ........... 707/202 |
| 2003/0033494 A1 * | 2/2003 | Fujibayashi et al. ......... 711/162 |
| 2005/0060507 A1 * | 3/2005 | Kasako et al. ............... 711/162 |
| 2005/0071559 A1 | 3/2005 | Tamura et al. |

FOREIGN PATENT DOCUMENTS

WO  WO 02/25445 A2  3/2002

\* cited by examiner

*Primary Examiner*—Reginald G Bragdon
*Assistant Examiner*—Kenneth M Lo
(74) *Attorney, Agent, or Firm*—Brundidge & Stanger, P.C.

(57) ABSTRACT

Provided is a storage control system in which a number of storage controllers are connected, and restored data is forwarded from one storage controller to the other storage controller. This storage control system is configured by a first storage controller and a second storage controller being connected in a mutually communicable manner, and which performs data processing according to a request from a host system, the first storage controller having a virtual volume associated with a logical volume of the second storage controller; a cache memory associated with the virtual volume; and a control unit for controlling the data processing between the cache memory and the virtual volume; wherein the control unit purges the storage area of the cache memory corresponding to the virtual volume accessed by the host system upon storing the restored data of the logical volume in the cache memory.

13 Claims, 14 Drawing Sheets

| VDEV | EXTERNAL DEVICE INFORMATION ||||| |
|---|---|---|---|---|---|
| | DEVICE IDENTIFYING INFORMATION | CAPACITY (KB) | DEVICE TYPE | PATH INFORMATION ||
| | | | | WWN | LUN |
| 0 | DRFGTFNEIEK | 657,456 | DISK | 0xAABBCCDD | 0 |
| 1 | ADRFGTFNEIE | 89,854 | DISK | 0xAABBEEFF | 3 |
| 2 | GGRRFFDDERT | - | TAPE | 0x445566AAB | 5 |
| 3 | AABBCCDDEE | 5,544223 | DISK | 0x77DE12345 | 6 |
| | | | | 0x77DE12345 | 3 |
| | | | | 0x377DE7890 | 5 |

} ALTERNATE PATH

FIG.6
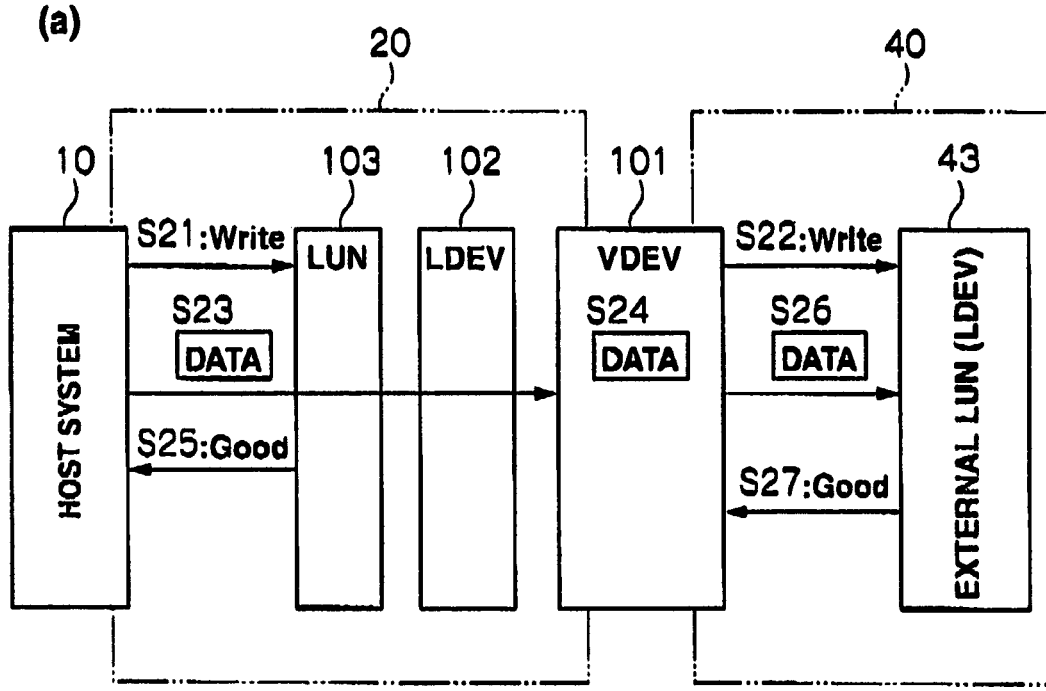
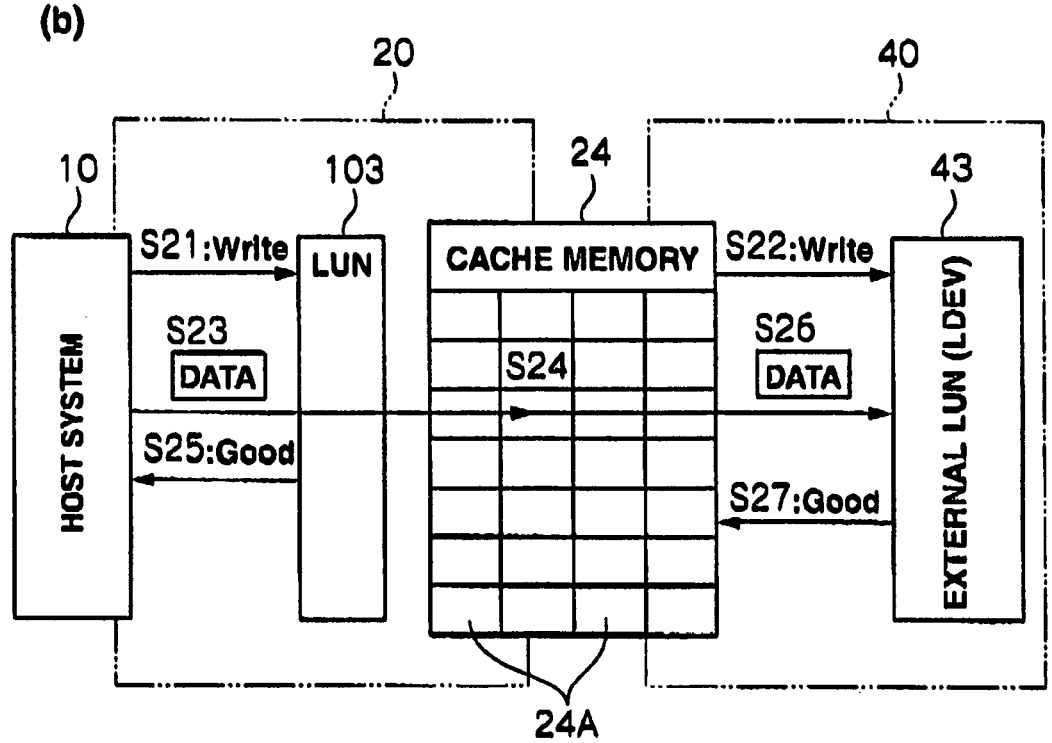

FIG.8
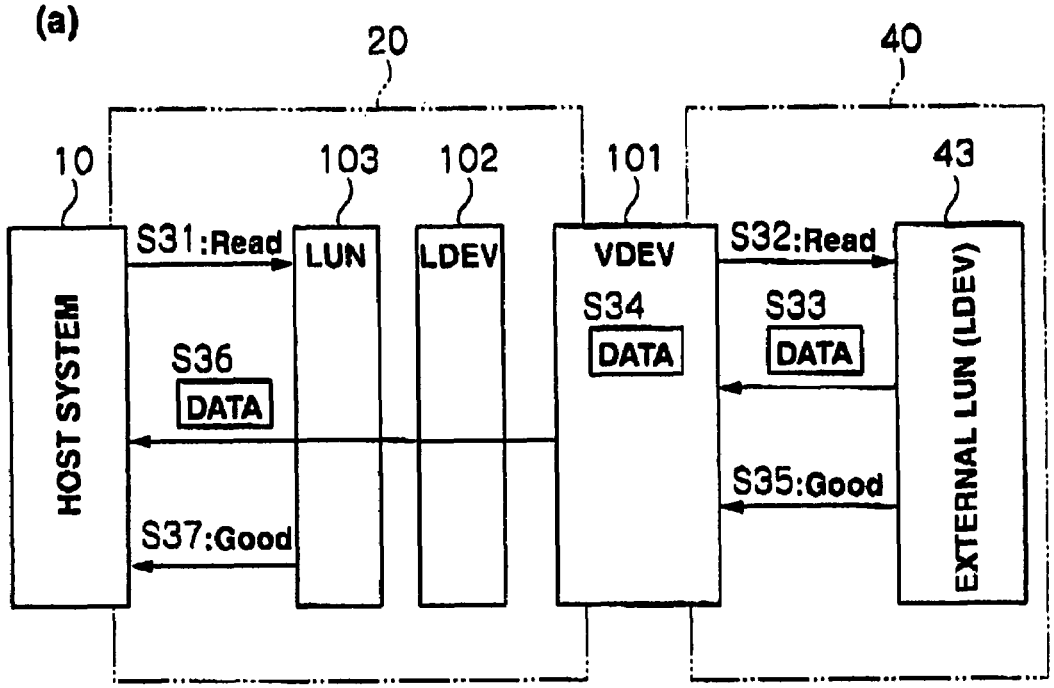
(a)
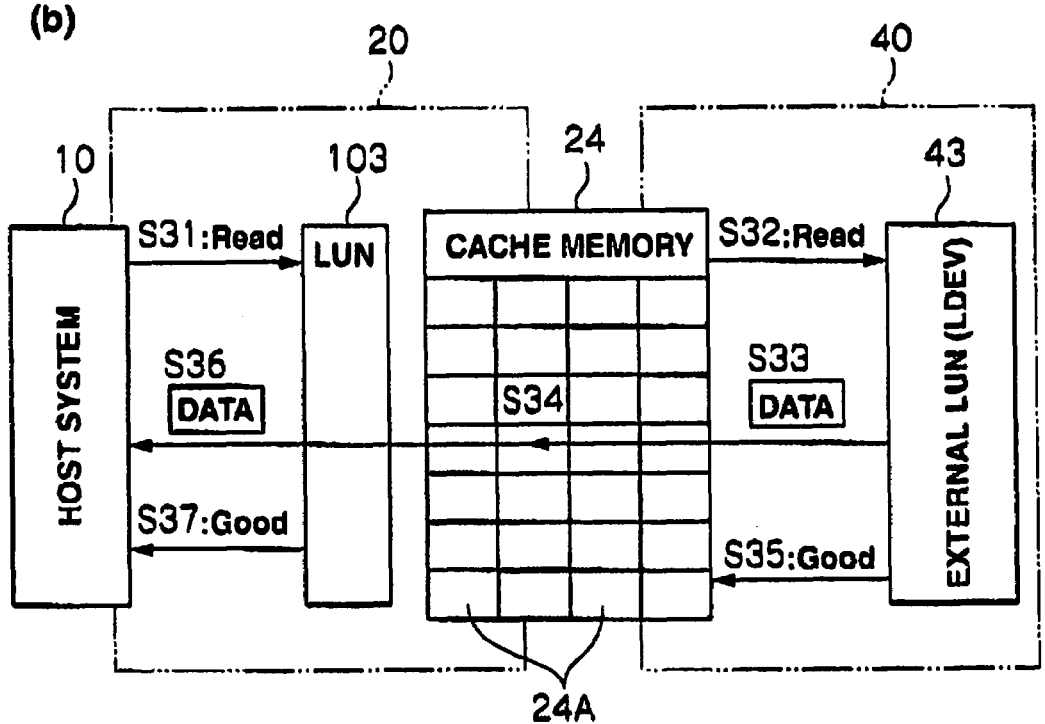
(b)

FIG.9
(1)
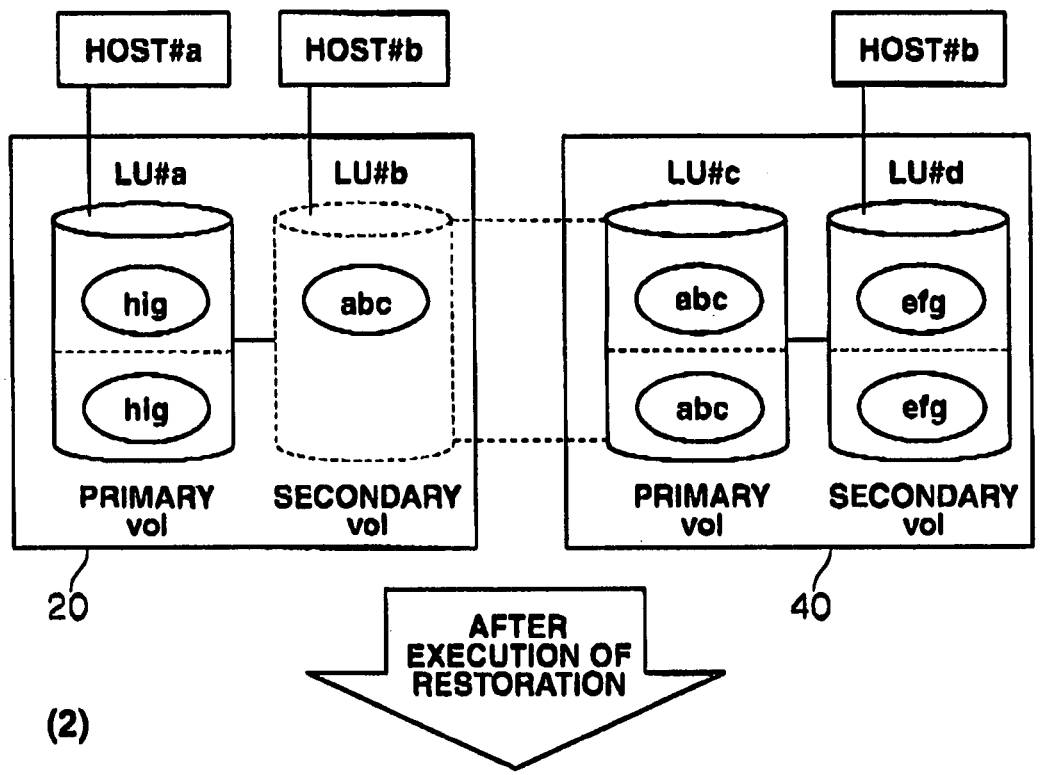
AFTER EXECUTION OF RESTORATION
(2)
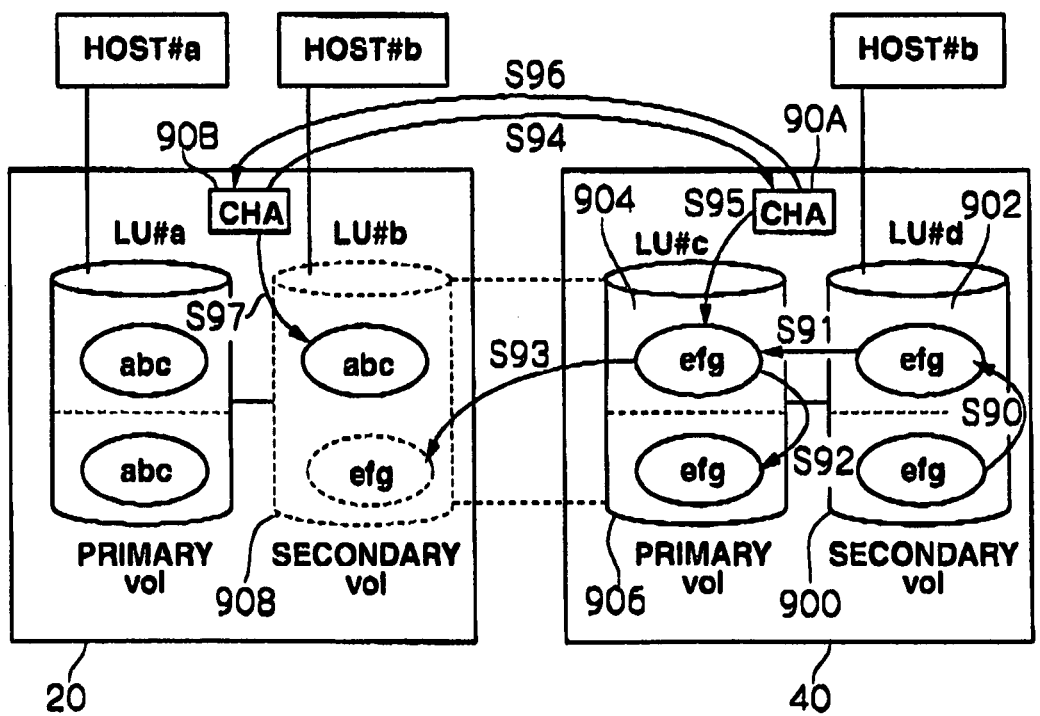

STORAGE CONTROL SYSTEM AND STORAGE CONTROL METHOD

CROSS-REFERENCE TO RELATED APPLICATIONS

This application relates to and claims priority from Japanese Patent Application No: 2005-133978, filed on May 2, 2005, the entire disclosure of which is incorporated herein by reference.

BACKGROUND OF THE INVENTION

1. Field of the Invention

The present invention relates to a storage control system having a storage controller connected to a host computer and which performs the communication of stored data with such host computer.

2. Description of the Related Art

For instance, with a database system that handles enormous amounts of data such as in a data center, data is managed with a storage control system configured separately from a host computer. This storage control system, for example, is configured by having a disk array device. A disk array device is configured by arranging numerous storage devices in an array and, for instance, is created based on RAID (Redundant Array of Independent Inexpensive Disks). At least one or more logical volumes, which are logical storage areas, are formed on the physical storage area provided by a logical storage device group, and this logical volume is provided to the host computer (more specifically, to a program of a database or the like operating on the host computer) as the host system. By transmitting a prescribed command to the disk array device, the host computer is able to write and read data into and from the logical volume.

In this type of storage control system, data destroyed due to the occurrence of failures during the execution of processing is restored at high speed from the backup data. For example, the disk array device described in Japanese Patent Laid-Open Publication No. 2001-216185 is configured as described below in order to restore data. The host issues a pair formation request and pair division request to the disk array device and, after creating a snapshot of the volume, starts the processing. A disk subsystem stores the position of the data renewed after the creation of the snapshot as difference information. Upon receiving the data restoration request from the host, the disk array device restores the data from its renewed location from the snapshot based on such difference information.

SUMMARY OF THE INVENTION

The conventional disk subsystem described above relates to the restoration within a single storage controller, and does not give consideration to the recovery of data upon connecting a plurality of storage controllers and restoring data from one storage controller to the other storage controller. Although it is desirable that the restoration of data among a plurality of storage controllers is conducted between storage controllers without going through the host in order to maintain the performance of the host, if data before restoration remains in the cache memory of the storage controller receiving the transmission of restored data, the data before restoration will be subject to a cache hit and forwarded to the host. Thus, when the host accesses the logical volume to which the storage resource of another storage controller is assigned, there is a problem in that the data before restoration will be visible to the host.

Thus, an object of the present invention is to provide a storage control system and a storage control method in which a plurality of storage controllers is connected, and restored data is forwarded from one storage controller to the other storage controller, whereby even when the host system accesses the logical volume of the forwarding destination of the restored data, the host system will be able to reliably access the restored data. Another object of the present invention is to provide a storage control system capable of shortening the time required for purging the cache memory, and enabling the host to quickly access the restored data.

In order to achieve the foregoing objects, the present invention is configured such that the restored data is stored in the storage area of the cache memory after purging the data before restoration remaining in the cache memory of the storage controller.

In other words, the present invention is a storage control system configured by a first storage controller and a second storage controller being connected in a mutually communicable manner, and which performs data processing according to a request from a host system, the first storage controller having: a virtual volume associated with a logical volume of the second storage controller; a cache memory associated with the virtual volume; and a control unit for controlling the data processing between the cache memory and the virtual volume; wherein the control unit purges the storage area of the cache memory corresponding to the virtual volume accessed by the host system upon storing the restored data of the logical volume in the cache memory.

Further, the present is also a storage control system configured by a first storage controller and a second storage controller being connected in a mutually communicable manner, and which performs data processing according to a request from a host system, the first and second storage controllers respectively having: a storage device; a logical volume having a logical storage configuration of the storage device and which is accessible from the host system; a cache memory for storing the data of the logical volume; and a control unit for controlling the data processing among the storage device, cache memory and logical volume; the first storage controller further comprising a virtual volume associated to the logical volume of the second storage controller without being associated to the storage device of the first storage controller, and which is accessible from the host system; wherein the control unit of the first storage controller purges the storage area of the cache memory corresponding to a management area of the virtual volume accessed by the host system upon storing the restored data of the logical volume of the second storage controller in the cache memory of the first storage controller.

In a preferred embodiment of the present invention, the logical volume of the second storage controller has a first logical volume and a second logical volume capable of forming a copy-pair relationship, and the first logical volume is associated with the virtual volume. The restoration of data from the second logical volume to the first logical volume is thereby implemented.

The control unit of the second storage controller copies the stored data of the second logical volume to the first logical volume upon receiving an order for the restoration, and further forwards to the virtual volume the data copied to the first logical volume. The logical volume of the first storage controller is in a copy-pair relationship with the virtual volume. The control unit of the first storage controller issues the restoration order to the control unit of the second storage controller. The host system issues the restoration order to the control unit of the second storage controller.

The control unit of the second controller starts the restoration after the control unit of the first storage controller completes the purge. The virtual volume has a directory configuration set with information for controlling the correspondence with the storage area of the cache memory of the first storage controller, the directory configuration has a plurality of management areas, and information for specifying the storage area of the cache memory of the first storage controller corresponding to the management area is set in each management area. Each of the management areas has information for controlling the validity or invalidity of the stored data of the cache memory storage area. The control unit of the first storage controller is configured so as to purge the specific information of the overall management area of the virtual volume, and subsequently assign the data stored in the logical volume of the second storage controller to the cache memory of the first storage controller so as to enable the host system to access the data. The control unit of the first storage controller is configured so as to purge the specific information of certain management areas of the virtual volume, and subsequently assign the data stored in the logical volume of the second storage controller to the cache memory of the first storage controller so as to enable the host system to access the data.

The control unit of the first storage controller sets an overall generation number to the virtual volume and sets individual generation numbers to each management area of the virtual volume, compares the generation number of the management area of the volume accessed by the host system and the overall [generation] number, and determines the data of the storage area of the cache memory corresponding to the management area to be the restored data when both numbers coincide, and purges the data of the storage area of the cache memory corresponding to the management area when both numbers do not coincide, and subsequently stores the restored data in the storage area. The control unit of the first storage controller renews the representative generation number of the virtual volume each time it receives the purge command from the host system. Another host system is connected to the logical volume of the second storage controller, and the restored data of the host system is stored in the logical volume. Another logical volume having a copy-pair relationship with the volume is provided to the first storage controller.

The purge processing is for the control unit of the first storage controller to set a control code indicating to the management area of the virtual volume that there is no correspondence with the storage area of the cache memory. The purge processing is for the control unit of the first storage controller to set a control code indicating to the management area that the stored data in the cache memory storage area is invalid. The control unit of the first storage controller stores the restored data in the storage area of the cache memory subject to the purge processing.

As described above, according to the present invention, in a storage control system in which a number of storage controllers are connected, and restored data is forwarded from one storage controller to the other storage controller, even when the host system accesses the logical volume of the forwarding destination of the restored data, the host system will be able to reliably access the restored data.

BRIEF DESCRIPTION OF THE DRAWINGS

FIG. 4 is an explanatory diagram showing the outline of the mapping table;

FIGS. 6(a) and (b) are a conceptual diagram showing a case of writing data in an external storage device virtualized as an internal volume;

FIGS. 8(a) and (b) are a conceptual diagram showing a case of reading data from an external storage device virtualized as an internal volume;

FIGS. 9(1) and (2) are a block diagram of the storage control system for explaining the purge processing of the cache memory, wherein FIG. 9(1) is for explaining the storage state of data prior to restoration, and FIG. 9(2) is for explaining the storage state of data after restoration;

DETAILED DESCRIPTION OF THE DRAWINGS

Embodiments of the present invention are now explained. The representative storage control system described below virtually sets a logical storage area to a first storage controller, associates (maps) a logical storage area of a second storage controller existing outside the first storage controller to this virtual area, and the first storage controller provides to the host system the storage area of the second storage controller as though it is one's own storage area.

Figure 1:
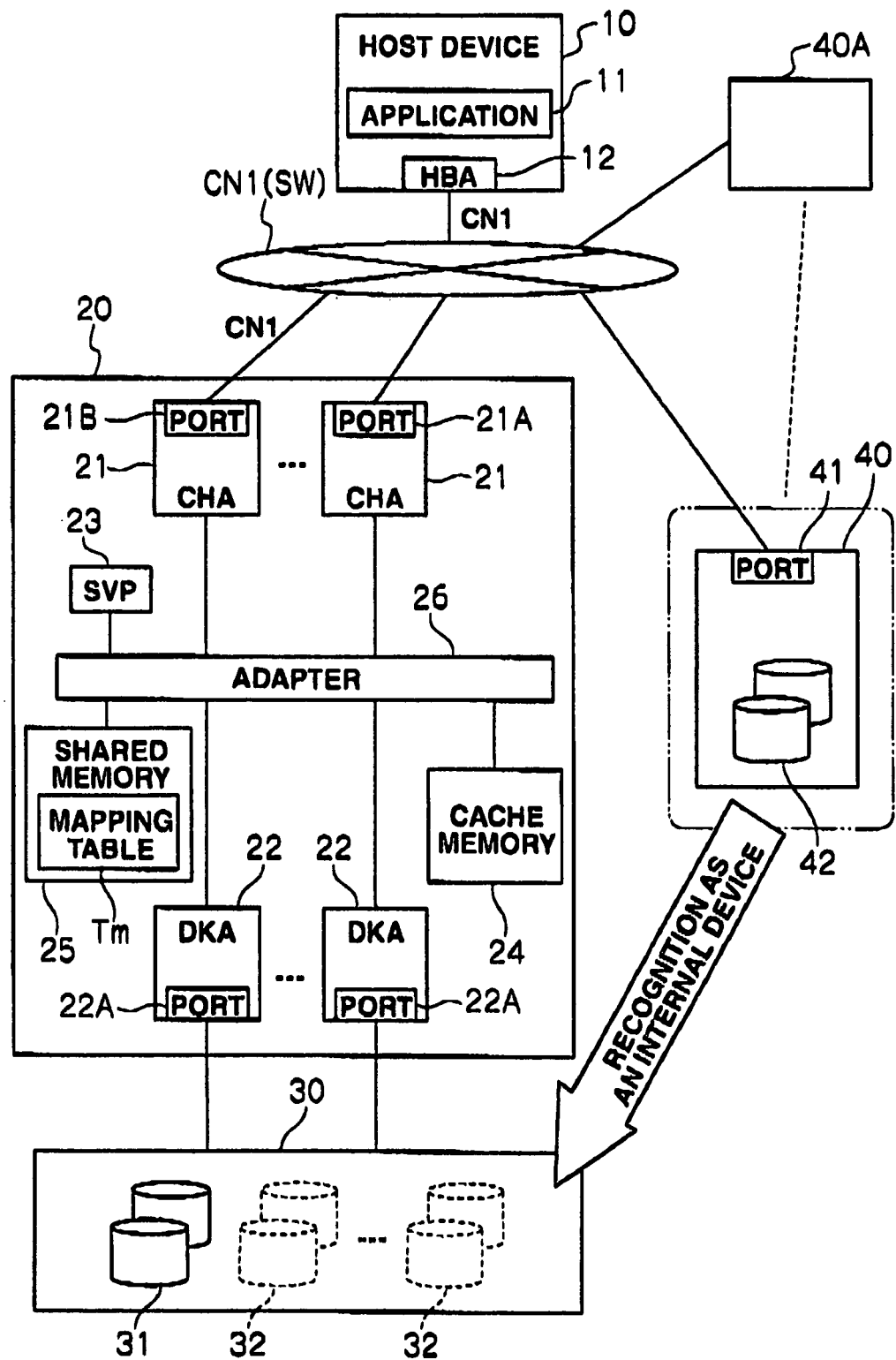
FIG. 1 is a block diagram showing the overall configuration of the storage system pertaining to an embodiment of the present invention.

FIG. 1 is a block diagram showing the configuration of the relevant parts of the storage control system. A host system 10 as a higher-level device, for instance, is a computer device having a CPU (Central Processing Unit), memory and the like, and, specifically, is configured as a personal computer, workstation, mainframe or the like. The host system 10, for example, has an information input device (not shown) such as a keyboard, switch, pointing device or microphone, and an information output device (not shown) such as a monitor display or speaker. Further, the host system 10, for instance, is loaded with an application program 11 such as database software that uses the storage area provided by the first storage controller 20, and equipped with an adapter 12 for accessing the first storage controller 20 via a communication network CN1.

The host system 10 is connected to the first storage controller 20 via the communication network CN1. As the communication network CN1, for instance, a LAN, SAN, Internet, dedicated line, public line and so on may be arbitrarily used on a case-by-case basis. Here, for example, the data communication via the LAN is conducted according to the TCP/IP (Transmission Control Protocol/Internet Protocol) protocol. When the host system 10 is to be connected to the first storage controller 20 via a LAN, the host system 10 will designate a file name and request data input/output in file units. Meanwhile, when the host system 10 is to be connected to the first storage controller 20 via a SAN, the host system 10, according to a fiber channel protocol, requests the data input/output in block units, which is a data management unit of the storing area provided by a plurality of disk storage apparatuses (disk drives). When the communication network CN1 is a LAN, the adapter 12, for example, will be a LAN-compatible network card. When the communication network CN1 is a SAN, the adapter 12, for example, will be a host bus adapter.

The switch circuit SW is configured by having a router or switchboard connected to the communication network. The switch circuit SW is constituted such that it is able to switch and connect the target port 41 of the second storage controller 40 and the target port 21B of the first storage controller [20] to the external port 21A of the first storage controller 20. Incidentally, since the first storage controller 20 is constituted such that it can be connected to the target port 21B of its own case via the external port 21A and switch circuit SW, this is classified as a so-called self-loop system. A network address is set to each port and the switch circuit.

The first storage controller 20, for example, is constituted as a disk array subsystem. However, it is not limited thereto, and, for instance, the first storage controller 20 may also be constituted as a highly sophisticated intelligent fibre channel switch. As described later, the first storage controller 20 provides the storage resource of the second storage controller 40 to the host system 10 as its own logical volume (logical unit).

The first storage controller 20 can be broadly classified into a controller unit and a memory apparatus unit. The controller unit, for example, has a plurality of channel adapters (CHA) 21, a plurality of disk adapters (DKA) 22, a service processor (SVP) 23, a cache memory 24, a shared memory 25, and a connector 26. This controller unit corresponds to the control unit claimed in the claims.

The channel adapter (CHA) 21 is used for performing data communication with the host system 10. The other channel adapter 21 is used for performing data communication with the internal logical volume of the second storage controller 40 via the external port 21A of the first storage controller and the target port 41 of the second storage controller [40]. Each channel adapter 21 is constituted as a microcomputer system having a microprocessor, memory and so on, and interprets and executes the various commands received from the host system 10. Since each channel adapter 21 is assigned a network address (e.g., an IP address or WWN (World Wide Name)) for identifying the respective channel adapters 21, each channel adapter 21 is able to function as an individual NAS (Network Attached Storage). When there is a plurality of host systems 10, each channel adapter 21 is provided to each host system, and is capable of individually receiving requests from each host system 10.

Each disk adapter (DKA) 22 transfers data between the storage devices 31, 32 of the memory apparatus 30. Each disk adapter 22 has a communication port 22A for connection to the storage devices 31, 32. Further, each disk adapter 22 is constituted as a microcomputer system comprising a microprocessor, memory and so on. Each disk adapter 22 writes the data that the channel adapter 21 received from the host system 10 in a prescribed address of a prescribed storage device 31, 32 based on the request (write command) from the host system 10, and reads the data from a prescribed address of a prescribed storage device 31, 32 based on the request (read command) from the host system 10 and transmits this to the host system 10. When data is to be input and output between the storage devices 31, 32, each disk adapter 22 converts the logical address into a physical address. When the storage devices 31, 32 are to be managed according to RAID, each disk adapter 22 will conduct data access according to the RAID configuration.

The service processor (SVP) 23 is used for controlling the operation of the overall device. A management client (not shown), for instance, is connected to the SVP 23. The SVP 23 is used for monitoring the occurrence of failures in the device and displaying such failures on the management client, and designating the close processing of the storage disk based on the order from the management client. Further, the management client of the SVP 23 executes the processing for defining the virtual volume as described later, The management client, for example, is configured by a management program being loaded in a JAVA (registered trademark) applet.

The cache memory 24 is used for temporarily storing the data received from the host system 10, or the data read out from the storage devices 31, 32. Various types of control information and the like required to be used in the operation of the first storage controller are stored in the shared memory 25. In addition to a work area being set in the shared memory 25, various tables such as the mapping table Tm described later are also stored therein. Further, the cache memory 24 and shared memory 25 may be configured as separate memories, or a part of the same memory may be used as the cache area of the storage area, and the other storage area may be used as the control area thereof. Incidentally, one or a plurality of storage devices 31, 32 may be used as the cache disk.

The connector 26 interconnects the respective channel adapters 21, respective disk adapters 22, SVP 23, cache memory 24, and shared memory 25. The connector 26, for example, may be constituted as a high-speed bus such as an ultra high-speed crossbar switch for performing data transmission based on high-speed switching operations.

The memory apparatus 30 has a plurality of storage devices 31. As the storage device 31, for instance, a device such as a hard disk, flexible disk, magnetic tape, semiconductor memory, optical disk or the like may be used. Further, for example, different types of disks such as an FC (Fibre Channel) disk or SATA (Serial AT Attachment) disk may coexist in the memory apparatus 30. The storage device 32 represented with dotted lines inside the memory apparatus 30 shows a state where the storage device 42 of the second storage controller 40 is incorporated into the first storage controller 20. In other words, the storage device 42 existing outside when viewed from the first storage controller 20 is recognized as the internal storage device of the first storage controller 20, and the storage resource of the external storage device 42 is provided to the host system 10. This is enabled as described later by mapping the logical volume of the second storage controller 40 to the virtual volume, which is an intermediate logical storage area, in the first storage controller 20. The virtual volume is created by utilizing the memory space of the cache memory 24. The virtual volume formed in the first storage controller 20 is recognized by the host system 10 together with the actual logical volume in the first storage controller 20. Incidentally, the data exchange with the external storage device 32 represented with the dotted line in FIG. 1 is conducted by the disk adapter of the second storage controller 40.

The second storage controller 40 has a communication port (target port) 41 and a storage device 42. In addition, [the second storage controller 40] may also have a channel adapter, disk adapter and so on. The second storage controller 40 is connected to the first storage controller 20 via the switch circuit SW, and the storage device 42 of the second storage controller 40 is treated as an internal storage device of the first storage controller 20. A plurality of external storage controllers 40A may be connected to the switch circuit SW.

Figure 2:
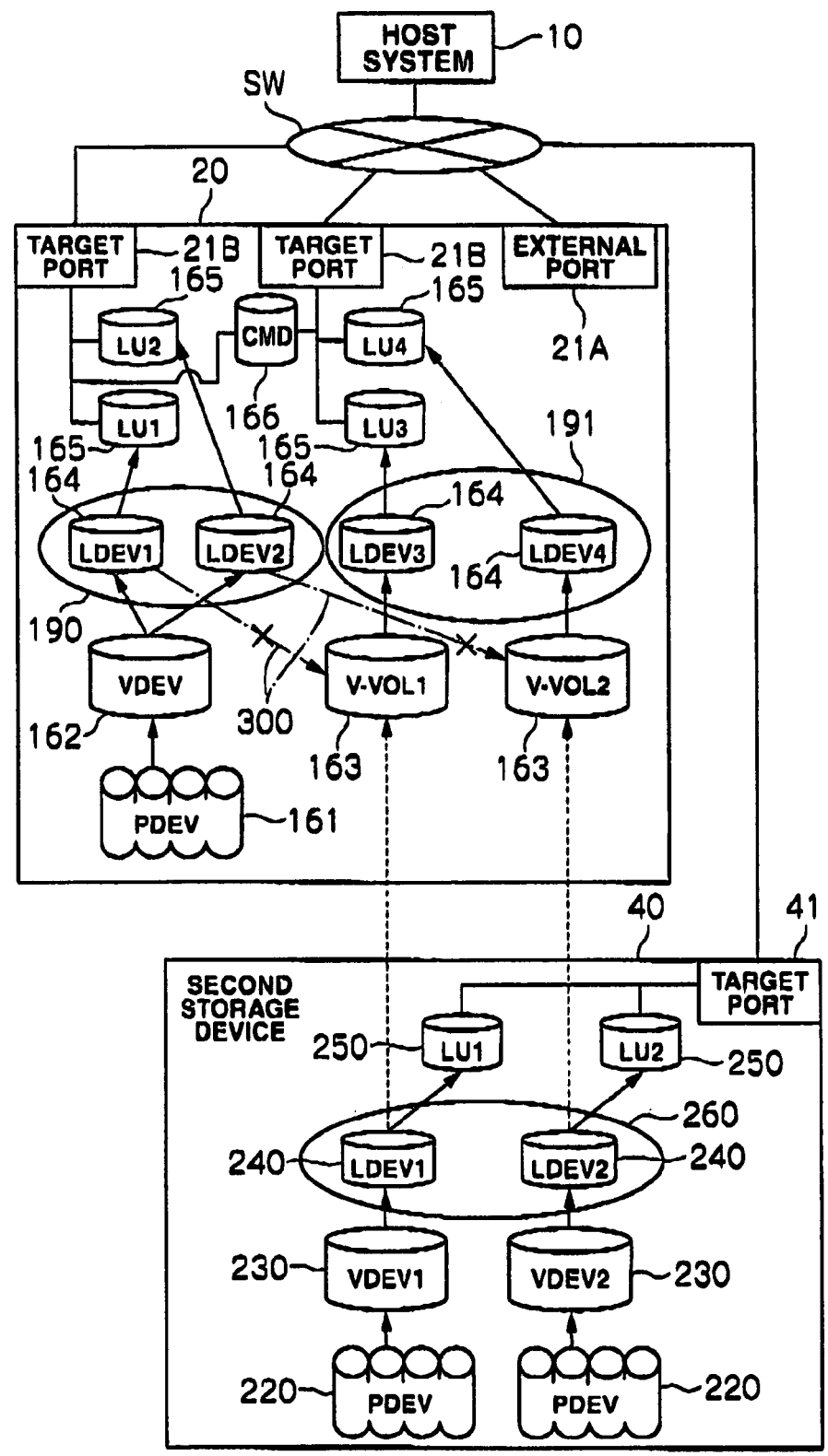
FIG. 2 is a view showing a frame format of the outline of the logical configuration of the storage system.

Next, FIG. 2 is explained. FIG. 2 is a block diagram showing the schematic of one storage configuration of the first storage controller 20 and second storage controller 40. Foremost, the configuration of the first storage controller is explained.

The storage configuration of the first storage controller, for instance, may be broadly classified in a physical storage hierarchy and a logical storage hierarchy. A physical storage hierarchy is configured from a PDEV (Physical Device) 161, which is a physical device. A PDEV corresponds to a disk drive.

A logical storage hierarchy may be configured from a plurality of (for example, two types of) hierarchies. One logical hierarchy may be configured from a VDEV (Virtual Device) 162 and a virtual VDEV (hereinafter also referred to as a "V-VOL") treated as a VDEV 162. The other logical hierarchy may be configured from a LDEV (Logical Device) 164.

The VDEV 162, for example, is configured by grouping a prescribed number of PDEVs 16, such as in a set of fours (3D+1P), or a set of eights (7D+1P). The storage areas provided respectively from each PDEV 161 belonging to the group are assembled to form a single RAID storage area. This RAID storage area becomes the VDEV 162.

In contrast to the VDEV 162 being created on a physical storage area, the V-VOL 163 is a virtual intermediate storage device that does not require a physical storage area. The V-VOL 163 is not directly associated with a physical storage area, and is a virtual existence to become the receiver for mapping an LU (Logical Unit) 250 of the second storage controller 41.

At least one or more LDEVs 164 may be provided on the VDEV 162 or V-VOL 163. The LDEV 164, for instance, may be configured by dividing the VDEV 162 in a fixed length. When the host 10 is an open host, by the LDEV 164 being mapped with the LU 165, the host 10 will recognize the LDEV 164 as a single physical disk. An open host can access a desired LDEV 164 by designating the LUN (Logical Unit Number) or logical block address. Incidentally, a mainframe host will directly recognize the LDEV 164.

The LU 165 is a device that can be recognized as a logical unit of SCSI. Each LU 165 is connected to the host 10 via the target port 21B. At least one or more LDEVs 164 may be respectively associated with each LU 165. As a result of associating a plurality of LDEVs 164 to a single LU 165, the LU size can be virtually expanded.

A CMD (Command Device) 166 is a dedicated LU to be used for transferring commands and statuses between the I/O control program operating on the host 10 and the controllers (CHA 21, DKA 22) of the storage controller 20 (c.f. FIG. 1). A command from the host 10 is written in the CMD 166. The controller of the [first] storage controller 20 executes the processing according to the command written in the CMD 166, and writes the execution result thereof as the status in the CMD 166. The host system 10 reads and confirms the status written in the CMD 166, and writes the processing contents to be executed subsequently in the CMD 166. As described above, the host system 10 is able to give various designations to the [first] storage controller 20 via the CMD 166.

Incidentally, the command received from the host system 10 may also be processed without being stored in the CMD 166. Moreover, the CMD may be created as a virtual device without defining the actual device (LU) and configured to receive and process the command from the host system 10. In other words, for example, the CHA 21 writes the command received from the host system 10 in the shared memory 25, and the CHA 21 or DKA 22 processes this command stored in the shared memory 25. The processing results are written in the shared memory 25, and transmitted from the CHA 21 to the host system 10.

Meanwhile, as described above, the target port 41 of the second storage controller 40 or the target port 21B of the first storage controller 20 may be connected to the external port 21A, which is used for external connection, of the first storage controller 20 via the switch circuit SW.

The second storage controller 40 has a plurality of PDEVs 220, a VDEV 230 set on the storage area provided by the PDEV 220, and an LDEV 240 in which at least one of more thereof may be set on the VDEV 230. Each LDEV 240 is respectively associated with the LU 250.

In the present embodiment, the LU 250 (i.e., LDEV 240) of the second storage controller 40 is mapped to the V-VOL 163, which is a virtual intermediate storage device, and is handled as the internal logical volume of the first storage controller 20.

For example, the "LDEV 1", "LDEV 2" of the second storage controller 40 are respectively mapped to the "V-VOL 1", "V-VOL 2" of the first storage controller 20 via the "LU 1", "LU 2". And, "V-VOL 1", "V-VOL2" are respectively mapped to the "LDEV 3", "LDEV 4", and the host system 10 is thereby able to access the storage area of the second storage controller [40] via the "LU 3", "LU 4".

Incidentally, the VDEV 162, V-VOL 163 may adopt the RAID configuration. In other words, a single disk drive 161 may be assigned to a plurality of VDEVs 162, V-VOLs 163 (slicing), and a single VDEV 162, V-VOL 163 may be formed from a plurality of disk drives 161 (striping).

The "LDEV 1" or "LDEV 2" of the first storage controller 20 corresponds to an actual logical volume 190 having a storage area in the first storage controller 20. The "LDEV 3" or "LDEV 4" of the first storage controller 20 corresponds to virtual volume 191 having a storage area in the second storage controller [40], but which does not have a storage area in the first storage controller [20]. The "LDEV 1" or "LDEV 2" of the second storage controller 40 corresponds to a logical volume 260 corresponding to (mapped with) the virtual volume. As described above, the actual logical volume 190 is formed based on the physical storage device (i.e., a disk drive or the like) provided in the first storage controller 20. The virtual volume 191 is a virtual existence, and the actual means for storing data exists in the second storage controller 40. In other words, the virtual volume 191 is configured such that the logical volume 260 of the second storage controller 40 is mapped to a prescribed layer of the storage hierarchy of the first storage controller 20.

According to FIG. 2, the CHA 21 of the first storage controller 20 recognizes the volume referable from the external port 21A as an external device. The foregoing virtual volume to be mapped to this external storage device is defined in the first storage controller 20. This defining operation is executed, for instance, with a JAVA (registered trademark) applet, which is a management client of the SVP 23 described above. This definition information is placed in the shared memory 25 as a mapping table Tm. However, as represented with reference numeral 300 in FIG. 2, a virtual volume cannot be mapped to the logical volume 190 of the first storage controller.

Figure 3:
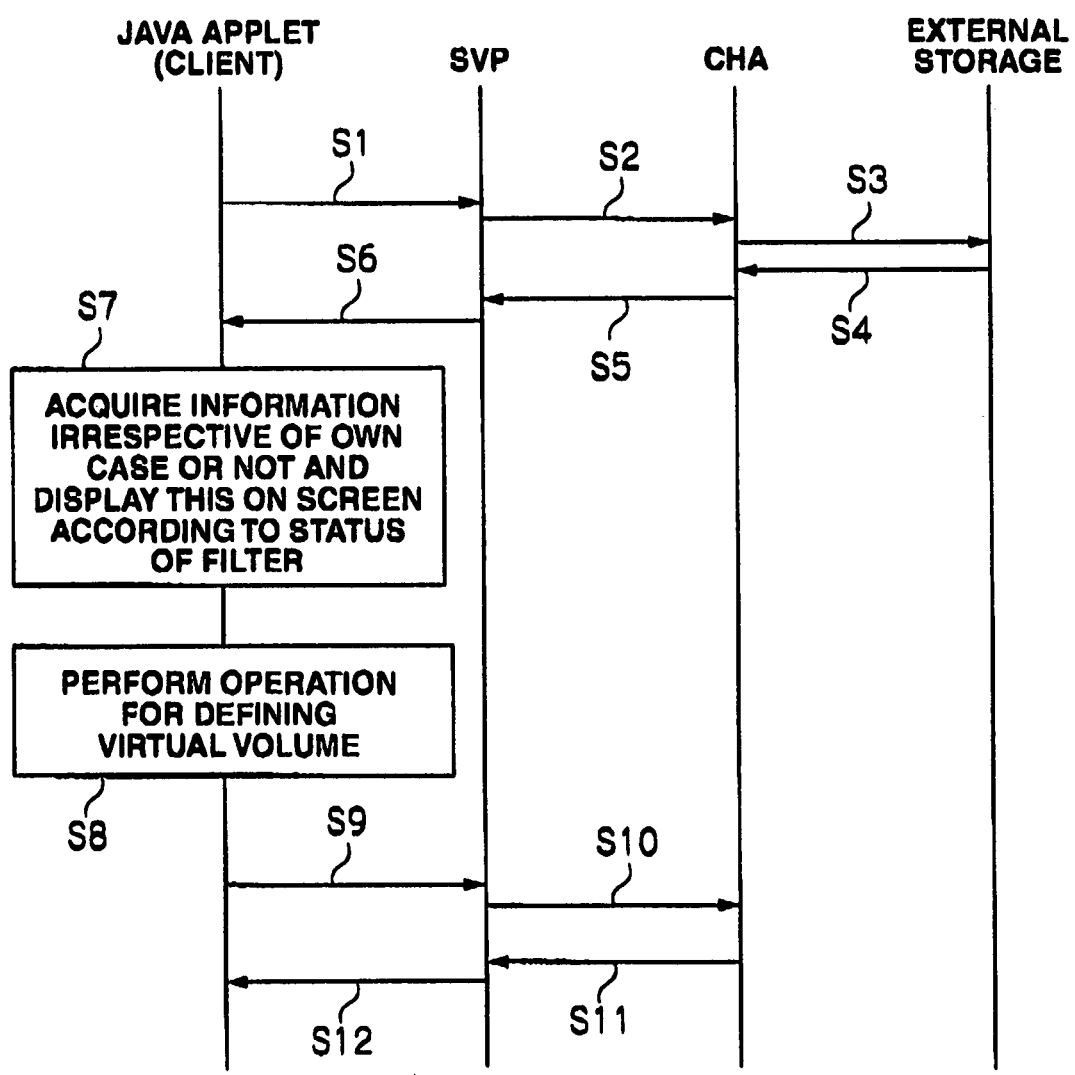
FIG. 3 is a diagram showing the flow of the setting operation of the virtual logical volume.

Next, the operation for setting the virtual volume in the first storage controller 20 is explained. FIG. 3 shows the flow of this setting operation. The JAVA (registered trademark) applet on the management client requests the SVP to acquire (discover) logical volume information referable from the external port 21A (FIG. 1) (S1). The SVP receiving this request commands the execution of such discovery to the CHA 21 (FIG. 1) of the first storage controller [20] (S2). The CHA refers to the shared memory 25, acquires the IP address of the switch circuit SW to access the switch circuit SW via the external port 21A, and acquires the information of all volumes referable from this switch circuit [SW]. In other words, the CHA executes the discovery of the internal logical volume connectable to the external port 21A without distinguishing whether it is the internal logical volume of one's own case, or the internal logical volume of another storage controller (S3). As shown in FIG. 1, the volume referable by the CHA 21 via the switch circuit SW connected to the external port 21A is the logical volume of the first storage controller 20 and the logical volume of the second storage controller 40.

Next, the CHA 21 of the first storage controller 20 and the CHA (not shown) of the second storage controller 40 respectively refer to the shared memory and acquire characteristic data of their respective internal logical volumes (S4). The CHA 21 that received this characteristic data transmits the characteristic data to the JAVA (registered trademark) applet of the management client via the SVP 32 (S5, S6). The JAVA (registered trademark) applet is loaded with a storage management application for determining, with respect to each of the plurality of internal logical volumes referred to by the discovery from information such as the "vendor name, model name, serial number of the storage" in the characteristic data, whether the case to which the extracted internal logical volume belongs is one's own storage controller to which the CHA 21 belongs, or an external storage controller.

This management application has a module for filtering whether the plurality of internal logical volumes extracted by the discovery is suitable as a candidate for the foregoing virtual volume. The management application filters each type of extracted information regarding the plurality of logical volumes with this filtering module (S7), and performs screen display processing for the logical volumes having consistent conditions as a candidate group of the mapping destination of the virtual volume.

In the present embodiment, as described above, the management application is programmed such that the internal logical volume of the first storage controller 20 will not be displayed as a candidate group as the volume to which the virtual volume is to be mapped. Subsequently, the management client requests the SVP to execute the definition processing of the virtual volume (S8, S9). The SVP makes the CHA execute the definition processing of the virtual volume; that is, the processing operation for creating the mapping table described above (S10), and receives the processing result thereof and sends this to the management client (S11, S12). Since the internal logical volume of one's own case (first storage controller 20) is not displayed as the mapping destination of the virtual volume in one's own case, the user of the management client will not be able to set the virtual volume in the internal logical volume of one's own case. As described above, the virtual volume setting control is realized by the SVP and management client. This setting processing can also be realized with the processor of the CHA or DKA.

Next, details regarding the definition processing of the virtual volume are explained. FIG. 4 is an example of the configuration of the mapping table Tm described above. The mapping table Tm may be configured, for instance, by respectively associating the VDEV numbers for respectively identifying the VDEVs and the information of the external storage device. The external device information, for example, may contain the device identifying information, storage capacity of the storage device, information for classifying the device (e.g., whether it is a tape device or disk device), and path information to the storage device. Further, the path information may include identifying information (WWN) unique to each communication port (21A and 21B of FIG. 1), and the LU number for identifying the LU of FIG. 2.

Incidentally, the device identifying information, WWN and so on illustrated in FIG. 4 are values used for the convenience of explanation, and do not have any particular significance. Further, the VDEV indicated with VDEV number "3" shown at the lower part of FIG. 4 has three pieces of path information associated therewith. In other words, the external storage device (42 of FIG. 1) mapped to this VDEV (#3) is internally equipped with an alternate path configuration having three pathways, and the VDEV is mapped upon recognizing this alternate path configuration. Since it is known that the same storage area can be accessed via any of these three pathways, even when a failure occurs to one or two of these pathways, it will still be possible to access desired data via the remaining normal pathway. By adopting the mapping table Tm shown in FIG. 4, one or a plurality of external storage devices 42 may be mapped to one or more VDEVs in the first storage controller 20.

Figure 5:
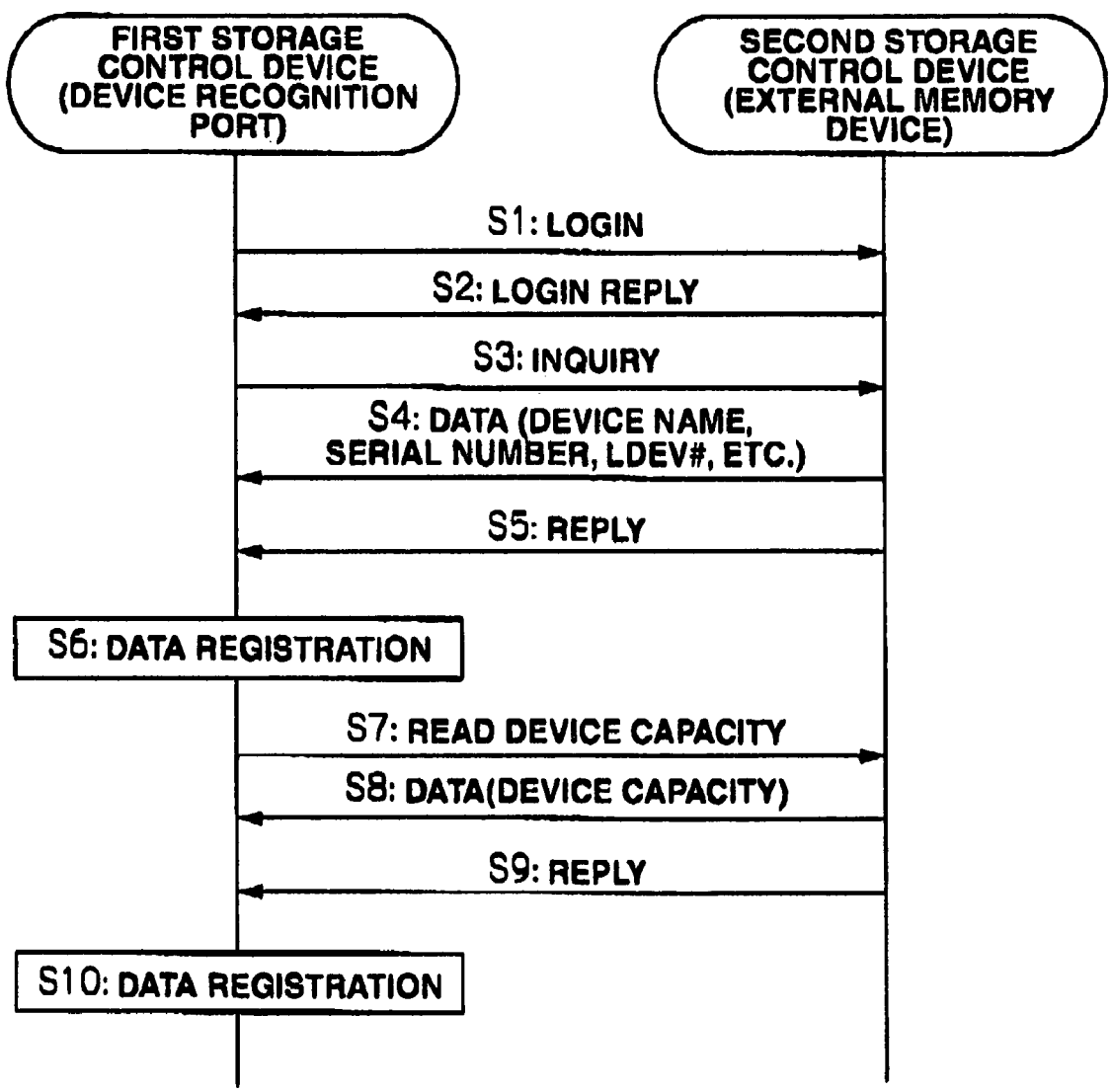
FIG. 5 is a diagram showing the flow of the processing for creating a mapping table.

Next, an example of mapping the external storage device 42 to the VDEV 101 is explained with reference to FIG. 5. FIG. 5 is a time chart showing the relevant parts of the processing performed between the first storage controller 20 and second storage controller 40 during the mapping process. Foremost, the first storage controller 20 logs onto the second storage controller 40 from the external port (21A) of the channel adapter 21 via the switch circuit SW (S1). As a result of the second storage controller 40 replying to the login of the first storage controller 20, the login process will be completed (S2). Next, the first storage controller 20, for instance, transmits to the second storage controller 40 a referral command (inquiry command) set forth in the SCSI (Small Computer System Interface) standard, and seeks the reply regarding the details of the storage device 42 of the second storage controller 40 (S3). This is the same as the discovery operation described above.

The referral command is used for clarifying the type and configuration of the reference device, and is capable of penetrating the hierarchy of the reference device and comprehending its physical configuration. As a result of using this referral command, the first storage controller 20, for example, is able to acquire the device name, device type, serial number (product ID), LDEV number, various types of version information, vendor ID and other information from the second storage controller 40 (S4). The second storage controller 40 provides its reply by transmitting the inquired information to the first storage controller 20 (S5). The information extracted in the discovery is stored in the shared memory. Steps S3 to S5 may be omitted by the CHA utilizing this stored information.

The first storage controller 20 registers the information acquired from the second storage controller 40 in a prescribed location of the mapping table Tm (S6). Next, the first storage controller 20 reads the storage capacity of the storage device 42 from the second storage controller 40 (S7). The second storage controller 40 sends back the storage capacity of the storage device 42 in response to the inquiry from the first storage controller 20 (S8) so as to return its reply (S9). The first storage controller 20 registers the storage capacity of the storage device 42 in a prescribed location of the mapping table Tm (S10).

The mapping table Tm can be created by performing the foregoing processing. When inputting and outputting data with the external storage device 42 (external LUN; i.e., external LDEV) mapped to the VDEV of the first storage controller 20, address conversion and so on are performed upon reference to the other tables described later.

Figure 7:
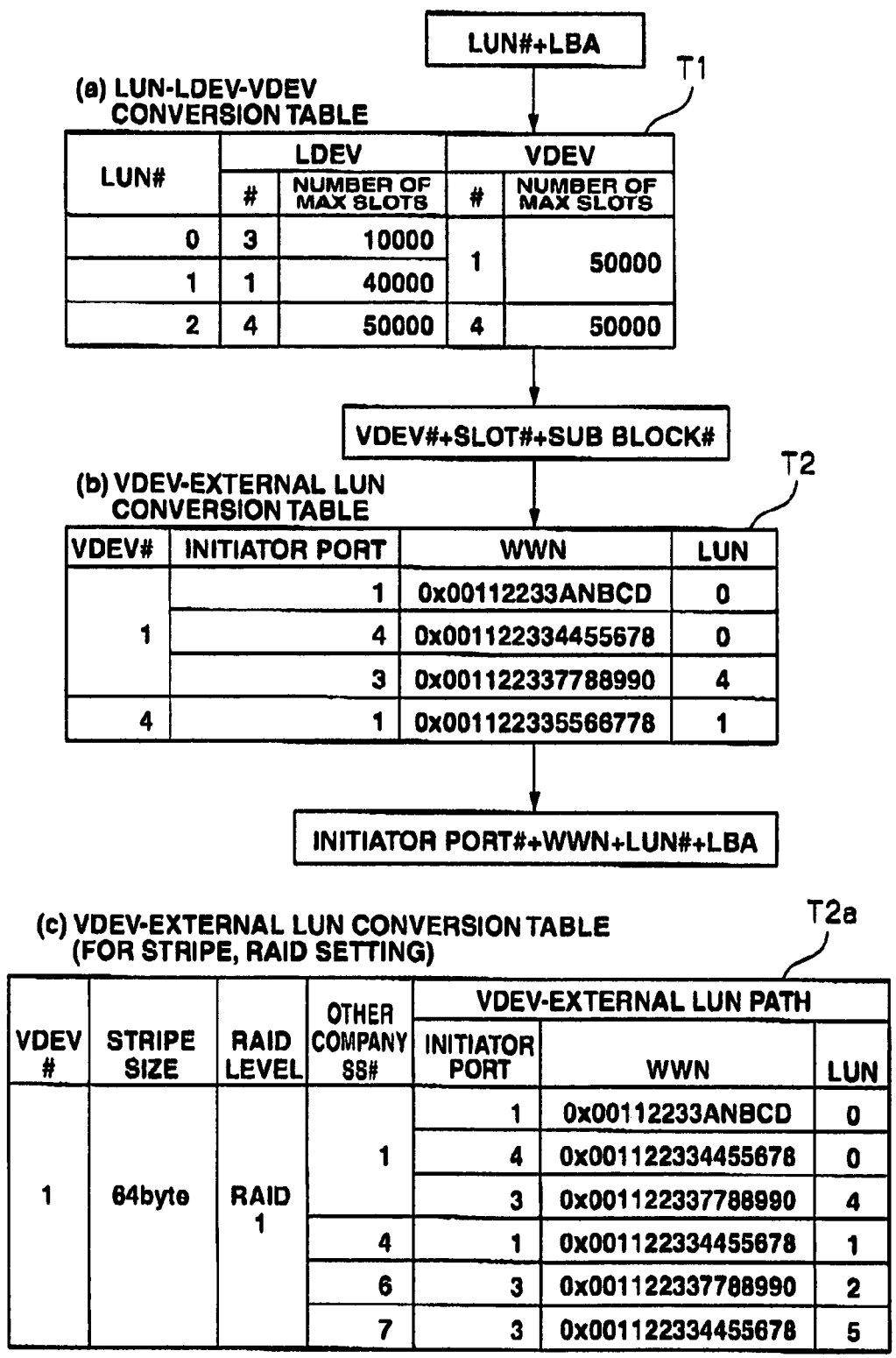
FIG. 7 is an explanatory diagram showing a frame format of the condition of the address conversion of the write data.

The input and output of data between the first storage controller 20 and second storage controller 40 is now explained with reference to FIG. 6 to FIG. 8. Foremost, the case of writing data is explained with reference to FIG. 6 and FIG. 7. FIG. 6 is a view showing a frame format of the processing upon writing data. FIG. 7 is an explanatory diagram showing the processing flow illustrated in FIG. 6 in relation to the various tables.

The host system 10 is able to write data in the logical volume (LDEV 102) provided by the first storage controller 20. For example, the host system 10 can be set to access only specific LDEVs 102 by methods such as zoning of setting a virtual SAN subnet in the SAN, or LUN masking of the host system 10 retaining a list of accessible LUNs.

When the LDEV 102 to which the host system 10 is attempting to write data is connected to the storage device 31, which is an internal storage device, via the VDEV 10, data is written via normal processing. In other words, data from the host system 10 is temporarily stored in the cache memory 24, and then stored in a prescribed address of a prescribed storage device 31 from the cache memory 24 via the disk adapter 22. Thereupon, the disk adapter 22 converts the logical address into a physical address. Further, in the case of a RAID configuration, the same data is stored in a plurality of storage devices 31.

Contrarily, when the LDEV 102 to which the host system 10 is attempting to write data is connected to the external storage device 42 via the VDEV 101, data is written according to the flow illustrated in FIG. 6. FIG. 6(a) is a flow diagram centered around the storage hierarchy, and FIG. 6(b) is a flow diagram centered around the usage of the cache memory 24.

The host system 10 defines the LDEV number for specifying the LDEV 102 of the write destination and the WWN for specifying the communication port 21A for accessing this LDEV 102, and issues a write command (Write) (S21). When the first storage controller 20 receives the write command from the host system 10, it creates a write command to be transmitted to the second storage controller 40, and transmits this to the second storage controller 40 (S22). The first storage controller 20 creates a now write command by changing the write destination address information and the like in the write command received from the host system 10 in accordance with the external LDEV 43.

Next, the host system 10 transmits the data to be written to the first storage controller 40 (S23). The data received by the first storage controller 20 is forwarded to the external LDEV 43 (S26) from the LDEV 102 via the VDEV 101 (S24). Here, at the point in time the first storage controller 20 stores the data from the host system 10 in the cache memory 24, it returns a reply (Good) to the host system 10 indicating that the writing is complete (S25). At the point in time the second storage controller 40 receives the data from the first storage controller 20 (or at the time [the second storage controller 40] finishes writing in the storage device 42), it transmits a write completion report to the first storage controller 20 (S26). In other words, the timing of the first storage controller 20 reporting the completion of writing to the host system 10 (S25) and the timing of the data actually being stored in the storage device 42 will differ (asynchronous method). Therefore, the host system 10 will be freed from the date write processing before the data is actually stored in the storage device 42, and may perform other processes.

As shown in FIG. 6(b), a plurality of sub blocks 24A is provided to the cache memory 24. The first storage controller 20 converts the logical block address designated from the host system 10 into a sub block address, and stores the data in a prescribed location of the cache memory 24 (S24).

The situation of the data being converted with the use of various tables is now explained with reference to FIG. 7. As shown in the upper part of FIG. 7, the host system 10 transmits data to a prescribed communication port 21A upon designating the LUN number (LUN#) and logical block address (LBA). The first storage controller 20 converts the data (LUN#+LBA) input for the LDEV 102 into data for the VDEV 101 based on the first mapping table T1 illustrated in FIG. 7(a). The first mapping table T1 is a LUN-LDEV-VDEV mapping table for converting data designating the internal LUN 103 into data for the VDEV 101. This table T1, for instance, is configured by associating the LUN number (LUN#), the number (LDEV#) of the LDEV 102 corresponding to the LUN 103 and the maximum number of slots, and the number (VDEV#) of the VDEV 101 corresponding to the LDEV 102 and the maximum number of slots. As a result of referring to this table T1, data (LUN#+LBA) from the host system 10 is converted into data (VDEV#+SLOT#+SUB-BLOCK#) for the VDEV 101.

Next, the first storage controller 20 refers to the second mapping table T2 depicted in FIG. 7(b), and converts data for the VDEV 101 into data to be transmitted to and stored in an external LUN (LDEV) of the second storage controller 40. The second mapping table T2, for instance, is configured by associating the number of the VDEV 101 (VDEV#), initiator port number for transmitting the data from such VDEV 101 to the second storage controller 40, WWN for specifying the communication port 41 of the data forwarding destination, and LUN number accessible via this communication port. Based on this second mapping table T2, the first storage controller 20 converts the destination information of the data to be stored into the format of initiator port (target port) number+WWN+LUN#+LBA. Data in which the destination information has been changed as described above arrives at the designated communication port 41 from the designated initiator port via the communication network CN1. Then, the data is stored in a prescribed location of the LDEV accessible with the designated LUN 43. Since the LDEV is virtually created on a plurality of storage devices 42, the data address is converted into a physical address, and stored in a prescribed address of a prescribed disk.

FIG. 7(c) shows a separate second mapping table T2a. This mapping table T2a is used when applying striping or RAID to the VDEV 101 deriving from the external storage device 42. The mapping table T2a is configured by associating the VDEV number (VDEV#), stripe size, RAID level, number for identifying the second storage controller 40 (SS# (storage system number)), initiator port number, WWN of the communication port 41, and number of the LUN 43. With the example shown in FIG. 7(c), a single VDEV 101 configures RAID 1 by using a total of four external storage controllers specified by SS# (1, 4, 6, 7). Further, the three LUNs (#0, #0, #4) assigned to SS#1 are set in the same device (LDEV#). Incidentally, the volume of LUN #0 has an alternate path configuration with two access data paths. As described above, in the present embodiment, by configuring the VDEV 101 from a plurality of logical volumes (LDEVs) existing outside, the functions of striping or RAID can be added upon providing this to the host system 10.

The flow upon reading data from the LDEV of the second storage controller 40 is now explained with reference to FIG. 8. Foremost, the host system 10 designates the communication port 21A and transmits the read command of data to the first storage controller 20 (S31). When the first storage controller 20 receives the read command, it creates a read command for reading the requested data from the second storage controller 40. The first storage controller 20 transmits the created read command to the second storage controller 40 (S32). The second storage controller 40 reads the requested data from the storage device 42 according to the read command received from the first storage controller 20, transmits this to the first storage controller 20 (S33), and reports that the reading has been completed normally (S35). The first storage controller 20, as shown in FIG. 8(b), stores the data received from the second storage controller 40 in a prescribed location of the cache memory 24 (S34).

After reading the data stored in the cache memory 24 and performing address conversion, the first storage controller 20 transmits this to the host system 10 via the LUN 103 or the like (S36), and issues a read completion report (S37). This series of processes upon reading data is performed in reverse to the conversion operation described with reference to FIG. 7.

FIG. 8 shows a case where the channel adapter 21 of the first controller reads data from the second storage controller 40 according to the request from the host system 10, and storing this in the cache memory 24 configuring the virtual volume. The reference numeral 103 represents the LUN configuring the virtual volume, and the cache memory 24 corresponds to the actual storage area of the virtual volume. The external LUN is the logical volume storing the restored data described later.

Next, the tasks that were newly recognized by the present inventors and which became the turning point of realizing the present invention are explained. FIG. 9 is a block [diagram] of the storage control system in which the second storage controller 40 is connected to the first storage controller 20. FIG. 9(1) is a block diagram indicating the storage status of data before restoration, and FIG. 9(2) is a block diagram indicating the storage status of data after restoration. The actual logical volume LU #a and virtual volume LU #b are constituted in the first storage control system 20 so as to be capable of forming the copy-pair relationship described in Japanese Patent Laid-Open Publication No. 2001-216185.

LU #a is the primary volume to be identified according to the primary volume number, and LU #b is the secondary volume to be identified according to the secondary volume number. Similarly, the second storage controller 40 also has an actual logical volume LU #c (primary volume) and an actual logical volume #d (secondary volume) to mutually become a copy-pair relationship. If the primary volume and secondary volume are forming a copy-pair, either the primary volume or the secondary volume will be the copy source, and the other will be the copy destination, and the copying of all data will be conducted between the two volumes.

The virtual volume LU #b of the first storage controller, as explained with reference to FIG. 2, is mapped to the logical volume LU #c. The logical volume LU may also be an LDEV. Each actual logical volume LU #a, LU #c, LU #d corresponds to the physical storage area of the disk drive and the cache memory, and the conversion of data pursuant to the execution of the READ order and WRITE order of data is conducted with the storage device such as an HDD via the cache memory.

The virtual volume LU #b does not have a corresponding storage device, and is only configured from a cache memory. The host #b is able to access the data of the logical volume LU #c via the virtual volume LU #b. The upper end of each logical volume corresponds to the data stored in the cache memory, and the lower end corresponds to the data in the disk drive.

According to the system illustrated in FIG. 9, in the relationship where the first storage controller is connected to the second storage controller, generation management of data is enabled by utilizing the copy-pair function of copying data from the primary volume to the secondary volume. In other words, latest generation data may be stored in the actual logical volume LU #a accessible by the host #a, previous generation data may be stored in the virtual volume #b and actual logical volume #c accessible by the host #b, and further previous generation data may be stored in the actual logical volume LU #d accessible by the host #b. For example, if the latest generation data is made to be online data, data of one generation before can be made to be previous data 1 (e.g., data of previous day), and data of two generations before can be made to be previous data 2 (e.g., data of two days before), thereby enabling the storage control system illustrated in FIG. 9 to perform the generation management of data.

Restoration in the present invention refers to the storage of data of the logical volume LU #d of the second storage controller in the logical volume LU #c. By the host #b accessing the virtual volume LU #b, the [host #b] is able to access the restored data stored in the logical volume LU #c. According to a list, data of the storage controller 20 can be recovered based on the previous data stored in the storage resource of the storage controller 40.

The restoration processing is now explained. As described above, FIG. 9(1) shows the storage state of data of the storage control system before restoration, and FIG. 9(2) shows the state after the execution of restoration. When the DKA of the second storage controller 40 receives a restoration order from the host #b, it reads data (restored data) "efg" to become the target of restoration from the storage device 900 of the logical volume LU #d, and stores this in the storage area of the cache memory 902 of the logical volume LU #d (S90). The CHA 90A stores the data of the storage area of this cache memory 902 in the storage area of the cache memory 904 of the logical volume LU #c (S91). And, the DKA stores the data "efg" of this storage area in the storage area of the storage device 906 of the logical volume LU #c (S92).

Meanwhile, the CHA 90B of the first storage controller 20 executes the restoration order from the host #b, sets the block area of the cache memory 908 for storing the restored data, and forwards this setting information to the CHA 90A of the second storage controller 40 (S94). The CHA 90A reads the data "efg" of the storage area of the cache memory 904 storing the restored data (S95), and delivers this to the CHA 90B of the first storage controller 20 (S96). The CHA 90B stores this data "efg" in the block storage area of a predetermined cache memory 908 (S93).

Incidentally, although not shown in FIG. 9(2), if the logical volume LU #a and virtual volume #b form a copy pair, data of the storage area of the cache memory 908 corresponding to the virtual volume LU #b is copied to the storage area (cache memory and HDD) of the logical volume LU #a.

Here, when the second storage controller 40 executes the restoration order, as shown in FIG. 9(2), data of the logical volume LU #c will change from "abc" to "efg". "efg" is forwarded to the virtual volume LU #b mapped to this logical volume LU #c. Nevertheless, since the data of "abc" before restoration is remaining in the storage area of the cache memory corresponding to this virtual volume, the host #b will see "abc", which is data before restoration, and not the restored data "efg".

Further, "abc", and not "efg", will also be copied to the primary logical volume LU #a in a copy-pair relationship with the virtual volume LU #b. With this, there is a problem in that the host #b will not be able to properly access the restored data of the second storage controller 40.

Thus, the first storage controller 20 receives a purge command from the host #b, and purges ("invalidates" or "releases") the data "abc" of the cache memory corresponding to the virtual volume LU #b upon executing the restoration order (S97). Here, purge corresponds to the processing for clearing the correspondence of the virtual volume and the storage area of the cache memory. After this processing finished, or in synchronization with this processing, the first storage controller 20 stores the restored data "efg" in the storage area of the cache memory.

Figure 10:
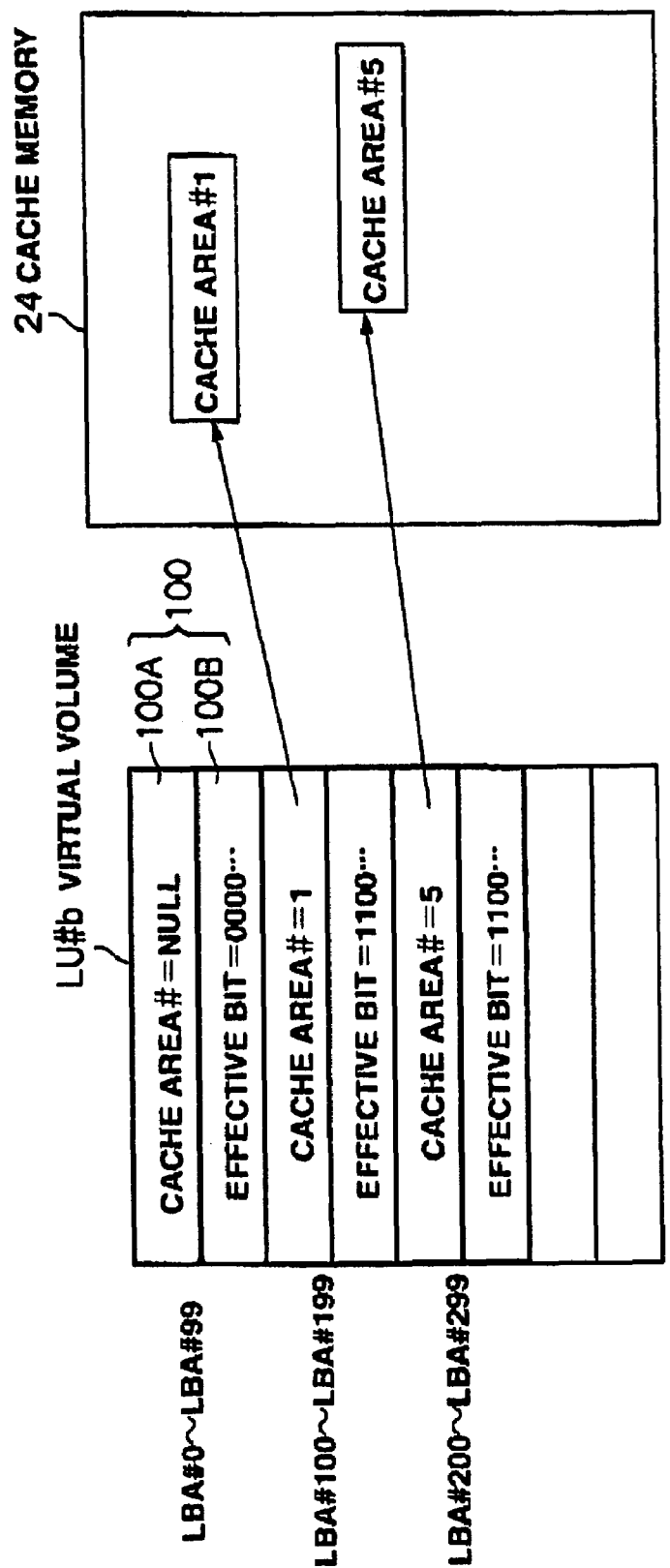
FIG. 10 is a block diagram of the directory configuration of the virtual volume and the storage configuration of the cache memory corresponding to such directory configuration in the first embodiment.

FIG. 10 is a block diagram showing the correspondence of the directory configuration of the virtual volume and the cache memory. The virtual volume LU #b is configured from a plurality of management areas 100, and one management area 100 is assigned for each 100 LBAs. A single management area is configured from a number (cache area#) 100A indicating the storage area of the cache memory, and an effective bit map. 100B showing whether the data in the cache area# is effective.

FIG. 10 shows that each block of the storage area (cache area) #1 of the cache memory corresponds to LBA#100 to LBA#199. The cache area # is divided into blocks corresponding to each LBA, and data corresponding to each LBA is placed in each block. Each bit of the bitmap corresponds to a single LBA and a block unit of the cache area corresponding thereto, and, when the effective bit is "0", this indicates that the data in block units corresponding to the cache area is invalid, and, when the effective bit is "1", this indicates that the data in corresponding block units is valid. When the effective bit is "0", and a read request is sent from the host to the corresponding LBA, it is necessary to read the data of the logical volume of the second storage controller.

In the cache area #1, data in block units corresponding to LBA#100 and LBA #101 is valid, and data in block units corresponding to LBA #102 and LBA #103 is invalid. [NULL] of the management area 100 indicates that there is no portion corresponding to the cache area. A cache area not assigned to the management area of the virtual volume is stored in a specific storage area of the shared memory (25 of FIG. 1) as a free queue.

When the read order from the host arrives at the management area of the virtual volume without any assignment of the cache area, the CHA of the first controller acquires information of the cache area from the free queue of the shared memory, and assigns this information to the management area of the virtual volume. The control information prescribing the directory configuration of the virtual volume illustrated in FIG. 10 is stored in the shared memory. Incidentally, although a virtual volume was described with reference to FIG. 10, the same applies to an actual logical volume.

Figure 11:
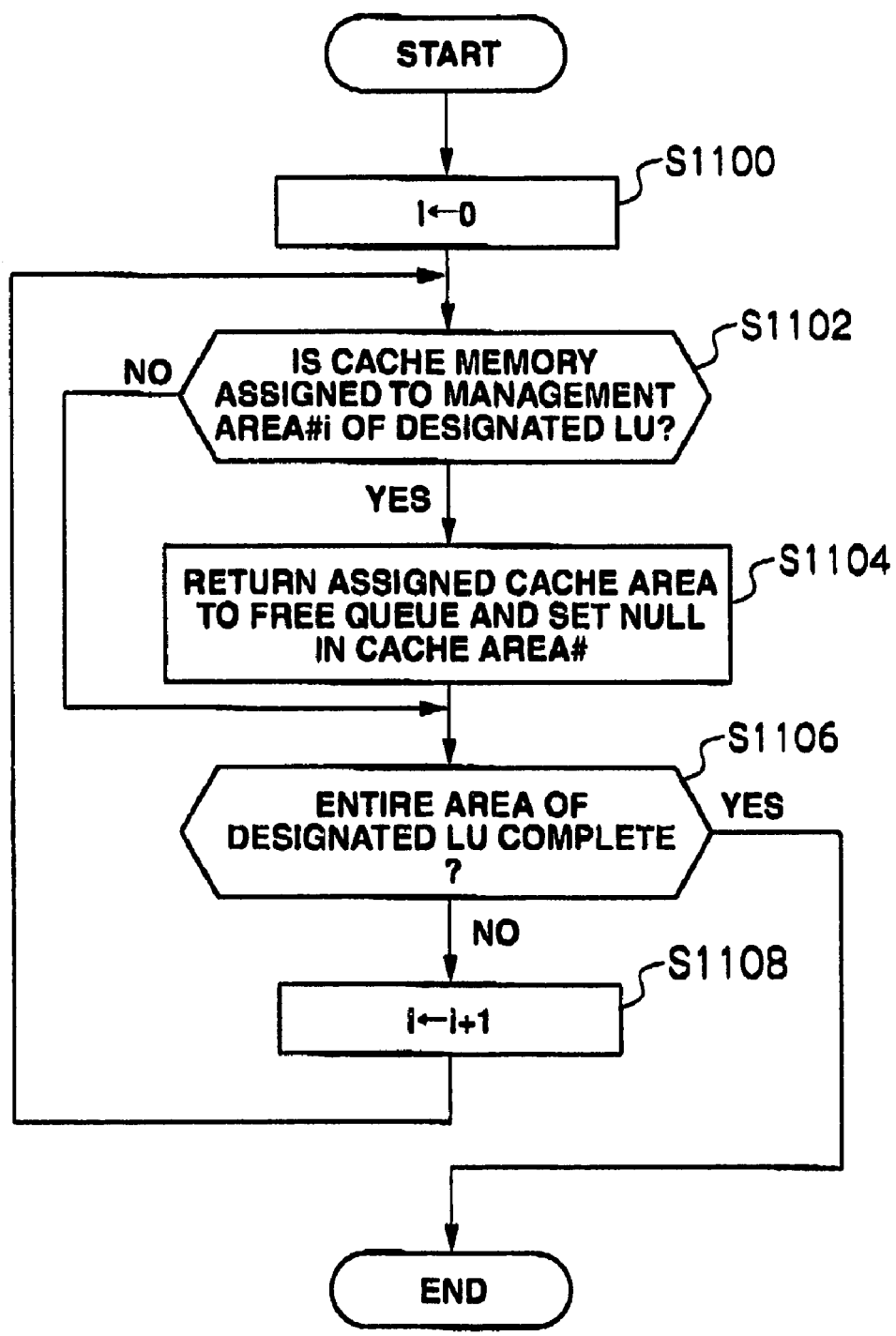
FIG. 11 is a flowchart for explaining the purge processing of the first embodiment.

FIG. 11 is a flowchart for explaining the purge processing in the present embodiment. The host #b illustrated in FIG. 9(2) designates the virtual volume to be subject to purge processing (S1100), and executes purge processing to the first management area of this virtual volume (S1102-S1106).

When the host issues a purge command to the first storage controller 40, the CHA 90B reads the directory configuration (FIG. 10) of the virtual volume of the shared memory, and determines whether information of the storage area of the cache memory has been set in the designated management area (S1102). When this is affirmed, the CHA 90B assigned cache area is returned to a free queue, and "NULL" is set in this cache area (S1104). When the determination at S1102 is denied and subsequent to the processing of S1104, the CHA determines whether the processing of S1102 and S1104 regarding the overall management area has been completed. When this is affirmed, the routine is ended. When this is denied, the processing of S1102 and S1104 is continued regarding the subsequent management area (S1108). Thereby, as a result of the data of the storage area of the cache memory being purged in relation to the overall management area of the virtual volume, data of the cache memory before restoration is prevented from being accessed by the host via the directory configuration of the virtual volume.

When this purge is completed, the CHA 90B (FIG. 9) of the first storage controller notifies the host #b of the completion of the purge. The host issues a restoration request to the CHA 90A of the second storage controller. The restoration order may also be sent by the CHA 90B of the first controller via the command device (166 of FIG. 2) without going through the host #b. The second memory apparatus that received the restoration request, as shown in FIG. 9, forms a copy pair of the logical volume LU #d and LU #c, and the data of the logical volume LU #d is copied (restored) to the logical volume LU #c. An area of the cache memory is arbitrarily selected from the free queue is assigned to the management area of the virtual volume accessed by the host, and the restored area is stored in the area of this cache memory. Since the logical volume LU #c is mapped to the virtual volume LU #b, the restored data of the cache memory of the logical volume LU #c is forwarded to the assigned cache area. Therefore, by the host #b accessing the management area of the virtual volume via the CHA 90B, the host #b will be able to access the restored data in the storage area of the cache memory corresponding to this management area.

As a result of setting [NULL] in the management area of the virtual volume, the data before restoration of the cache memory can be purged. Incidentally, as another example of purge processing, the effective bit (100B of FIG. 10) may be set to "0". Further, before the purging of the cache [memory] is finished, the second storage controller may start the restoration. However, if the purging of the cache memory of all management areas of the virtual volume is not finished, the host #b will not be able to access the restored data of the virtual volume LU #b. Since the logical volume capacity and cache capacity will increase in the future, the time required for purging will become longer, and as a result the time required for the host to use the restored data will also become longer.

Thus, in the second embodiment, the first storage controller determines whether the data of the storage area of the cache memory corresponding to the virtual volume access by the host is reflecting the restored data, and, when it is not reflecting the restored data, [the first storage controller] purges the data of this cache area and subsequently stores the restored data in this cache area so that the host system can access the restored data without having to wait for the purging of all management area to be completed.

Figure 12:
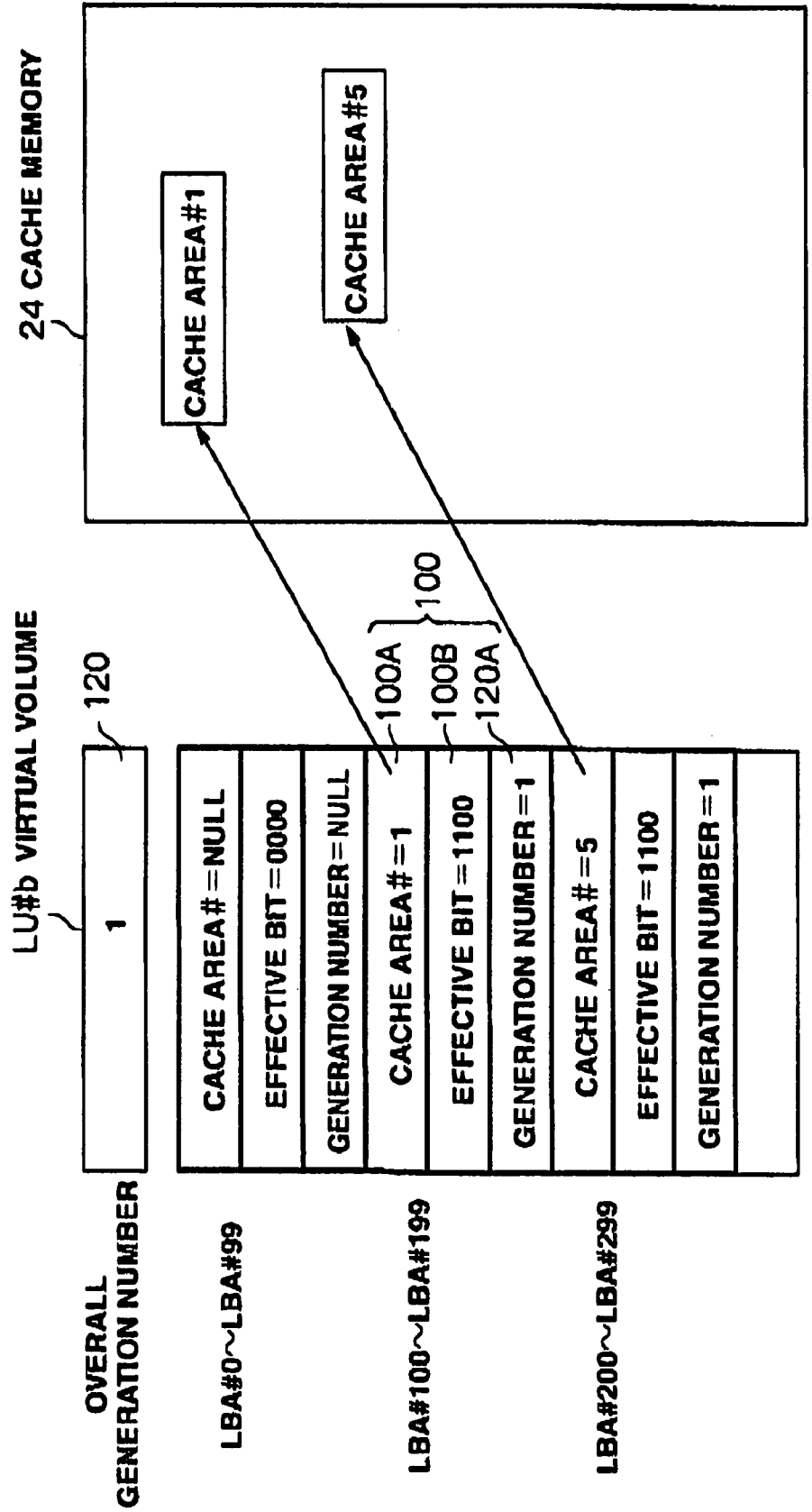
FIG. 12 is a block diagram of the directory configuration of the virtual volume and the storage configuration of the cache memory corresponding to such directory configuration in the second embodiment.

The directory configuration of the virtual volume for realizing the above is illustrated in FIG. 12. An overall generation number 120 is set for each LU corresponding to the virtual volume, and, in addition to the cache area 100A, effective bit 100B and so on shown in FIG. 10, an individual generation number 120A is also set in each management area. In FIG. 12, the cache area #1 of the virtual volume corresponds to the cache area #1 of the cache memory 24, and the cache area #5 of the virtual volume corresponds to the cache area #5 of the cache memory 24.

Figure 13:
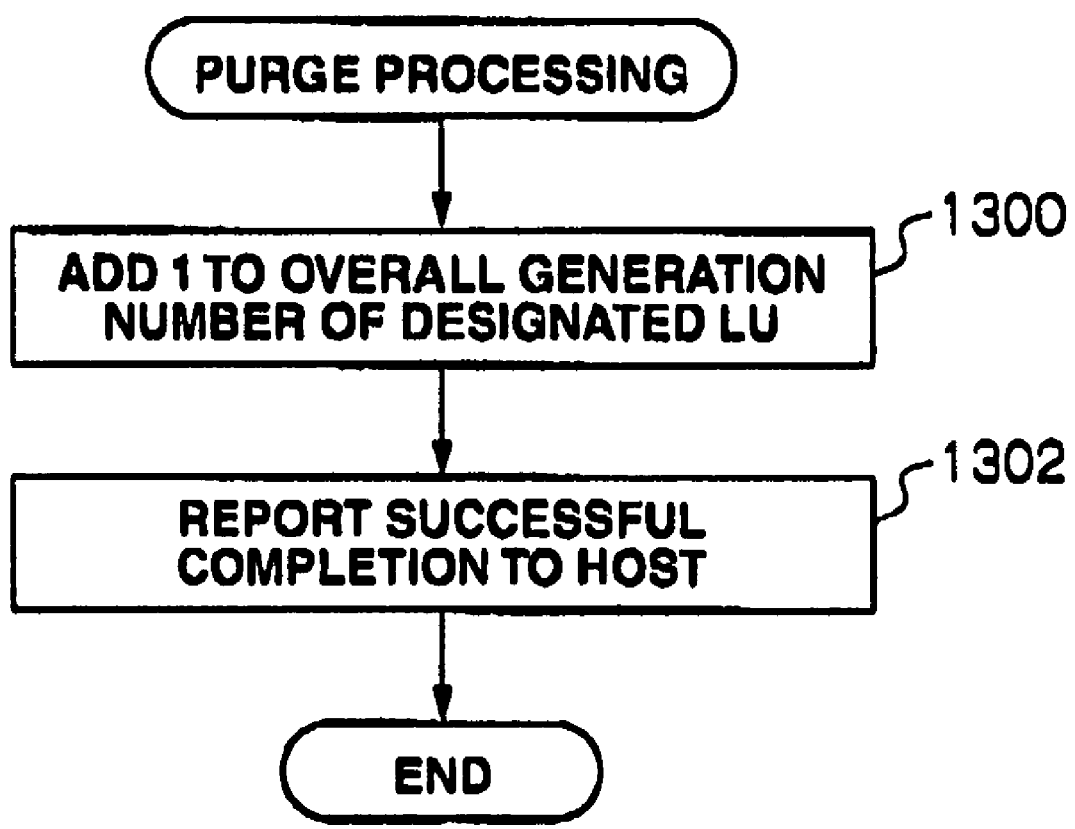
FIG. 13 is a flowchart of the purge processing in the second embodiment.

FIG. 13 is a flowchart for performing the purge processing of the present embodiment, and, when the purge request is output from the host #b to the storage controller 20 as shown in FIG. 9(2), the CHA 90B accesses the control information of the shared memory and designates the virtual volume, and increment 1 to the value of the overall generation number of the directory configuration of the virtual volume (S1300). Subsequently, the CHA 90B notifies the host #b of the successful completion. Upon receiving the order of the host #b, the storage controller 40 starts the restore processing between two internal logical volumes utilizing a shadow image.

Figure 14:
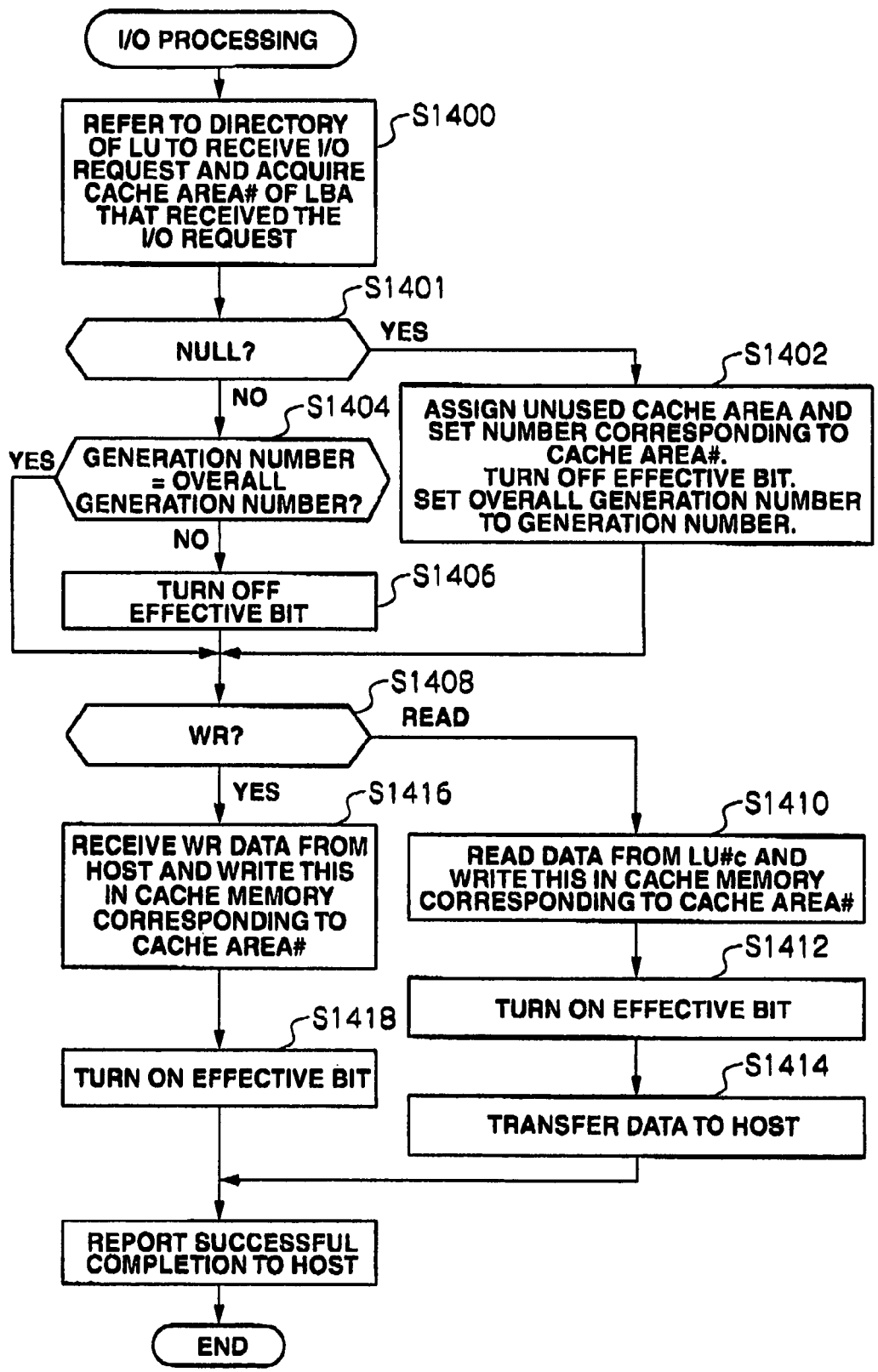
FIG. 14 is a flowchart showing a case where the host accesses the restored data.

When the host #b receives the notice of this successful completion, the access processing (I/O processing) to the restored data shown in FIG. 14 is commenced. When the host #b issues an I/O to the virtual volume LU #b (c.f. FIG. 9(2)), the CHA 90B of the first storage controller refers to the directory configuration, in the shared memory, of the virtual volume that received the I/O request from the host #b, and acquires the cache area (FIG. 12) of the LBA that received the I/O request (S1400). The CHA checks to see whether the control data of the cache area is NULL (S1401). When this is affirmed, the CHA assigns the cache area of the free queue of the cache memory to the management area to which the LBA belongs. [The CHA] further turns off the effective bit (100B of FIG. 12), and sets the representative generation number in the generation number (S1402).

At step S1401, when the information representing the cache area is not NULL, the CHA compares the generation number of the management area to which the LBA that received the I/O request belongs, and the overall generation number (S1404). When this comparison result is negative, the effective bit of the management area is turned off (S1406). When this is affirmed, the routine skips S1406 and jumps to S140B.

At S1408, the CHA determines whether the order from the host is a WRITE order or a READ order, and proceeds to S1410 in the case of the latter. The CHA reads the restored data from the LU #c, and writes the restored data in the storage area of the cache memory corresponding to the cache area# on the management area in the virtual volume LU #b designated in the LBA. Subsequently, the CHA turns on the effective bit of the management area (S1412), and forwards the restored data to the host (S1414).

At S1408, when the order from the host is a WRITE order, the CHA receives write data from the host, writes the write data in the storage area of the cache memory corresponding to the cache memory of the LBA that received the I/O request (S1416), and turns on the effective bit (S1418).

In this series of processes, the CHA of the first storage controller compares the generation number of the management area of the virtual volume corresponding to the LBA that received the I/O request from the host, and the overall generation number (S1404), and, when the two numbers coincide, is able to upload the correct restored data to the storage area of the cache memory (S1410). Meanwhile, when the generation numbers do not coincide, since the data of the storage area of the cache memory is inappropriate data that does not correspond to the restored data, the CHA of the first storage controller turns off the effective bit so as to purge the data of the cache memory (S1406), and subsequently sets the restored data in the management area of the virtual volume. In this embodiment, the control unit of the first controller identifies whether the data in the cache memory is data before restoration which needs to be purged, or restored data that may be accessed by the host. When purging is required, [the control unit of the first controller] reads the restored data from the external logical volume and refreshes the data before restoration in the storage area of the cache memory with the restored data. In this embodiment, since the purging of the cache memory is not performed in relation to the overall management of the virtual volume and it will suffice so as long as the data of the cache memory is purged with respect to the management area accessed by the host, there is an advantage in that the time required for the host to access the restored data can be shortened. Further, in this embodiment, since the purge processing and forwarding of the restored data are processed in parallel, the time required for the host to use the restored data can be shortened.

Incidentally, in the foregoing embodiments, although data was restored upon copying all data from the secondary volume in the second storage controller to the primary volume, the present invention may also be applied to a case where the host #c is connected to the logical volume LU #c (FIG. 9), and data is to be restored from a storage resource such as a tape device connected to this host. Further, the purge processing to be performed to the virtual volume may be performed to the overall virtual volume, in management area units, or LBA (logical block address) units.

What is claimed is:

1. A storage control system for performing data processing according to a request from a host system, comprising:
a first storage controller; and
a second storage controller connected to said first storage controller and having a first logical volume and a second logical volume, wherein said first storage controller comprises:
a virtual volume associated with said first logical volume of said second storage controller; and
a cache memory associated with said virtual volume, wherein, in accordance with a purge command, said first storage controller purges a storage area in said cache memory,
wherein, in accordance with a restore command, said second storage controller reads data to be restored from said second logical volume, stores the data in said first logical volume, thereby forming a copy pair of said first logical volume and said second logical volume, and sends the data to said first storage controller,
wherein said first storage controller receives the data from said second storage controller and stores the data in said storage area of said cache memory,
wherein said first storage controller determines whether data of a storage area of the cache memory corresponding to the virtual volume to be accessed by the host reflects restored data, and when the data of the cache memory storage area corresponding to the virtual volume does not reflect the restored data, the first storage controller purges the data of the cache memory storage area corresponding to the virtual volume and subsequently stores the restored data in the said cache memory storage area corresponding to the virtual volume,
wherein when the host issues an I/O to the virtual volume, the first storage controller acquires the cache area associated with the I/O request, and determines whether control data of the cache area is NULL,
wherein when the control data of the cache area is not NULL, the first storage controller compares a generation number of the received I/O request with an overall generation number,
wherein when the generation number coincides with the overall generation number, the first storage controller uploads the restored data to the storage area of the cache memory corresponding to the virtual volume, and
wherein when the generation number does not coincide with the overall generation number, the first storage controller determines that the data of the cache memory storage area corresponding to the virtual volume is data that does not correspond to the restored data, and the first storage controller purges the data of the cache memory storage area corresponding to the virtual volume, and subsequently stores the restored data.

2. The storage control system according to claim 1, wherein said first storage controller comprises a logical volume, said logical volume of said first storage controller being in a copy-pair relationship with said virtual volume.

3. The storage control system according to claim 1, wherein said first storage controller issues said restore command to said second storage controller.

4. The storage control system according to claim 1, wherein said host system issues said restore command to said second storage controller.

5. The storage control system according to claim 1, wherein said second storage controller starts to execute said restore command after said first storage controller completes purging said storage area.

6. The storage control system according to claim 1, wherein said virtual volume has a directory structure including management areas, each of said management areas storing storage area-specifying information, the storage area-specifying information specifying one of said storage areas of said cache memory corresponding to one of said management areas.

7. The storage control system according to claim 6, wherein each of said management areas stores information for indicating validity or invalidity of data stored in each of said storage areas.

8. The storage control system according to claim 6, wherein said first storage controller purges said storage area-specifying information for all said management areas of said virtual volume, and subsequently stores the data in said storage areas of said cache memory.

9. The storage control system according to claim 6, wherein said first storage controller purges said storage area-specifying information for some of said management areas of said virtual volume, and subsequently stores the data in said storage areas of said cache memory.

10. The storage control system according to claim 1, wherein said virtual volume has a directory structure including a plurality of management areas, and said first storage controller sets a control code in a management area of the plurality of management areas of said virtual volume to purge the storage area, the control code indicating lack of correspondence with the storage area of said cache memory.

11. The storage control system according to claim 1, wherein said first storage controller stores the data in said storage areas of said cache memory that is purged.

12. A method of controlling data stored in a storage control system including a first storage controller and a second storage controller connected to the first storage controller, the method comprising:

associating a virtual volume with said first logical volume of said second storage controller;

associating a cache memory disposed in the first storage controller with said virtual volume and, in accordance with a purge command sent from a host system, purging, under control of the first storage controller, a storage area of the cache memory;

in accordance with a restore command sent from a host system and under control of the second storage controller, reading data from the second logical volume, storing the data in the first logical volume, thereby forming a copy pair of the first logical volume and the second logical volume, sending the data to the first storage controller, and storing the data in said storage area of said cache memory;

determining, under control of the first storage controller, whether data of a storage area of the cache memory corresponding to the virtual volume to be accessed by the host reflects restored data, and when the data of the cache memory storage area corresponding to the virtual volume does not reflect the restored data, performing the purging of the data of the cache memory storage area corresponding to the virtual volume and then storing the restored data in the cache memory storage area corresponding to the virtual volume;

wherein when the host system issues an I/O to the virtual volume, the first storage controller acquires the cache area associated with the I/O request, and determines whether control data of the cache area is NULL, wherein when the control data of the cache area is not NULL, the first storage controller compares a generation number of the received I/O request with an overall generation number, wherein when the generation number coincides with the overall generation number, the first storage controller uploads the restored data to the storage area of the cache memory corresponding to the virtual volume, and wherein when the generation number does not coincide with the overall generation number, the first storage controller determines that the data of the cache memory storage area corresponding to the virtual volume is data that does not correspond to the restored data, and the first storage controller purges the data of the cache memory storage area corresponding to the virtual volume, and subsequently stores the restored data.

13. The storage control system according to claim 1, wherein said first storage controller updates the overall generation number of said virtual volume each time said first storage controller receives said purge command from said host system.

* * * * *